United States Patent [19]
Derocher et al.

[11] Patent Number: 5,914,702
[45] Date of Patent: Jun. 22, 1999

[54] POINTING DEVICE WITH WRAP-AROUND BUTTONS

[75] Inventors: Michael D. Derocher, Corvallis, Oreg.; Roger Brian Gimson; Julie Jane Seymour Parker, both of Redland, United Kingdom; Robert Paul Bliven, Corvallis, Oreg.

[73] Assignee: Hewlett-Packard Company, Palo Alto, Calif.

[21] Appl. No.: 08/610,781

[22] Filed: Mar. 4, 1996

[51] Int. Cl.⁶ ........................................... G09G 5/08
[52] U.S. Cl. ............................. 345/157; 345/168
[58] Field of Search ....................... 345/156, 157, 345/168, 161, 163, 167, 173, 160, 169; 364/708.1, 709.11, 709.12, 709.01; 361/680, 681, 683, 686; 74/471 XY; 341/22, 23; 178/18, 19

[56] References Cited

U.S. PATENT DOCUMENTS

| | | | |
|---|---|---|---|
| 4,719,455 | 1/1988 | Louis | 340/709 |
| 4,831,359 | 5/1989 | Newell | 341/5 |
| 4,891,632 | 1/1990 | Chang | 340/710 |
| 5,424,756 | 6/1995 | Ho et al. | 345/158 |
| 5,469,194 | 11/1995 | Clark et al. | 345/167 |
| 5,473,347 | 12/1995 | Collas et al. | 345/168 |
| 5,479,192 | 12/1995 | Carroll, Jr. et al. | 345/168 |
| 5,521,596 | 5/1996 | Selker et al. | 345/161 |
| 5,528,523 | 6/1996 | Yoshida | 345/157 |
| 5,546,334 | 8/1996 | Hsieh et al. | 345/167 |
| 5,594,618 | 1/1997 | Sellers | 345/168 |
| 5,615,083 | 3/1997 | Burnett | 364/708.1 |

FOREIGN PATENT DOCUMENTS

WO 89/06023  6/1989  WIPO ........................... G06K 11/06

OTHER PUBLICATIONS

BYTE, Oct. 1995, "Honorable Mentions" p. 161, right–hand column, paragraph 1.

BYTE, Jun. 1995, St Peterborough US, Advertisement from Dell Computers.

PC User, No. 200, Dec. 16, 1992, London, GB, p. 35, Author: Haney: "That Thinking Feeling".

*Primary Examiner*—Xiao Wu

[57] ABSTRACT

A pointing device includes ergonomic buttons which wrap around the device's cursor control mechanism. Each button extends along at least two sides of the cursor control mechanism. Corner junctions make the buttons easy to recognize by touch. One button is C-shaped, another backward-C-shaped. The cursor control mechanism includes a touchpad or a post and a "wobble" plate. The post serves as a pivot point for the plate and responds to directional pressure. A user adjusts the planar orientation of the plate to define a directional pressure applied to the post. A user is able to apply multi-fingered leveraged guidance. A second cursor control mechanism is defined by an erasure-head device. The erasure-head provides convenient, effective coarse control of the cursor's movement, while the wobble plate or touchpad cursor control mechanism provides convenient, effective fine control of the cursor's movement. The wrap-around buttons are active regardless of which of the two cursor control mechanisms currently are being manipulated.

10 Claims, 3 Drawing Sheets

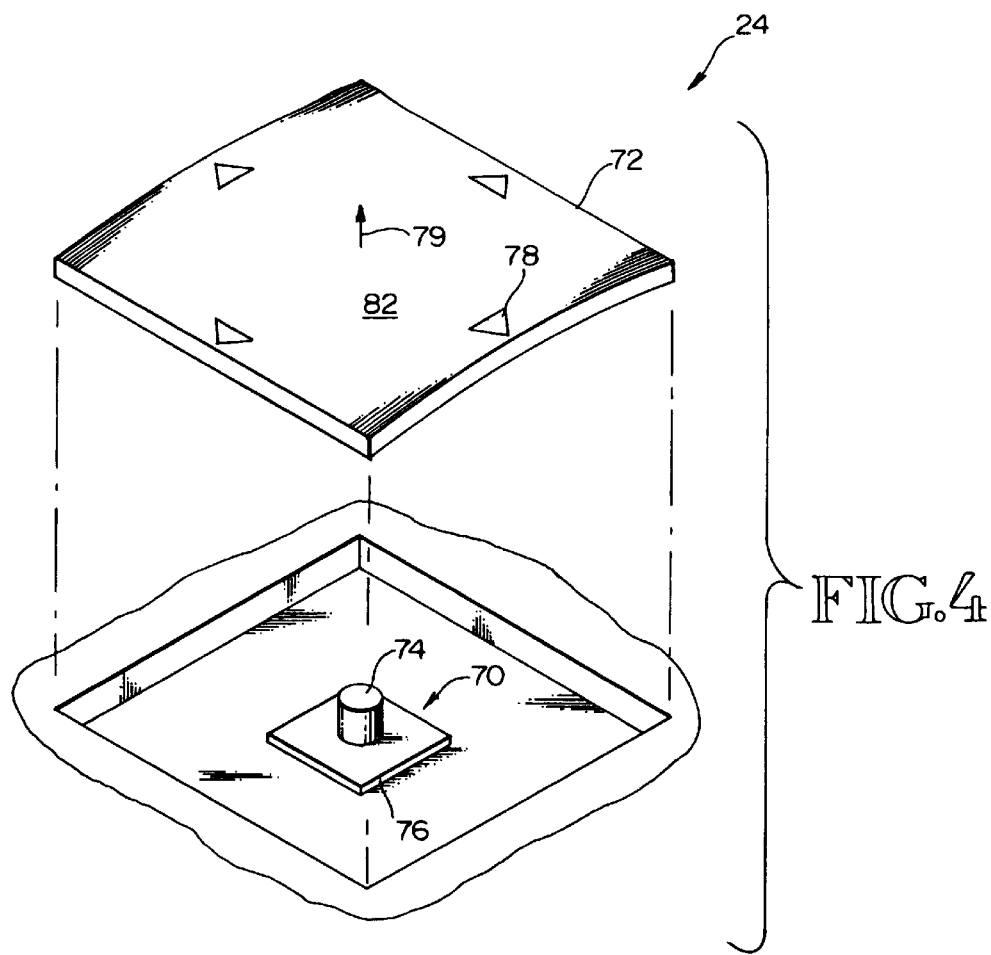
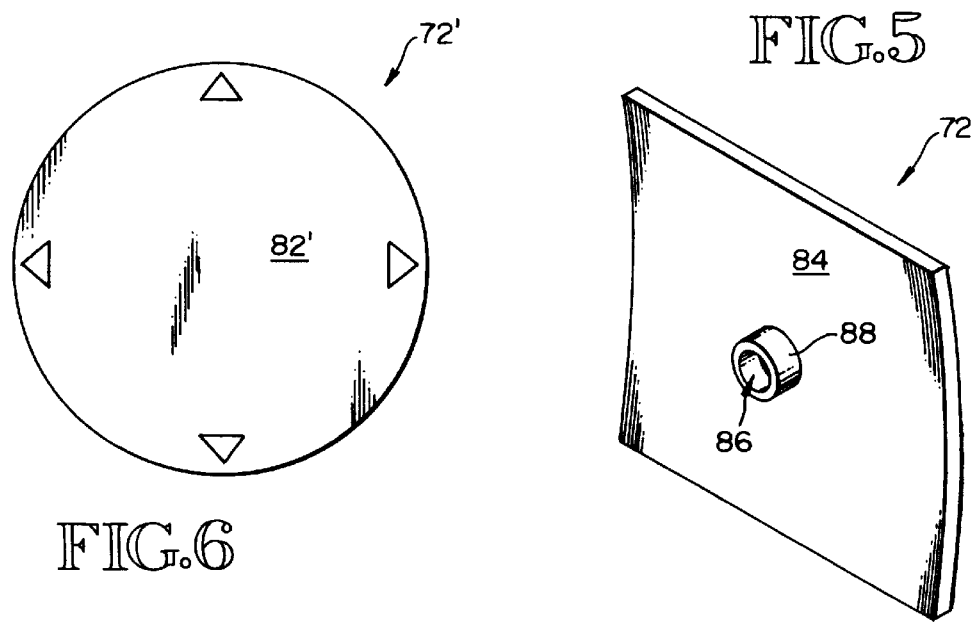

POINTING DEVICE WITH WRAP-AROUND BUTTONS

BACKGROUND OF THE INVENTION

This invention relates generally to computer pointing devices, and more particularly to pointing device buttons.

The adoption of the graphical user interface has provided a popular alternative to the command line interface which previously dominated the field of computing. Previously users had to memorize many command names and type in the appropriate command to control the computer. One of the realizations of the graphical user interface has been to make computing easier. To extend computing to a broad population, it is desirable to have an interface which does not require the user to learn and memorize intricate internal operations of the computer. Through the graphical user interface, objects and menus serve as reference choices and enable the design of more intuitive command sequences.

A key tool in working with a graphical user interface is a pointing device. A pointing device is an input device used to control an on-screen cursor for such actions as "pressing" on-screen buttons, choosing among a range of menu items, and selecting objects, cells or groups of words in a document. A pointing device also is used as a stylus in graphical applications for drawing lines and shapes. More recent functions include the "drag and drop" operation in which a displayed item is selected and moved elsewhere on the screen to perform a copy, move or delete operation.

The most common pointing device is referred to as a mouse. The basic features of a mouse are a casing having a generally flat bottom surface, one or more buttons on a top surface, a ball protruding partially from the bottom surface, and a cable for connecting the mouse to the computer. The mouse is designed to be gripped with one hand and held slightly above a reference surface so that the ball remains in contact with the reference surface. As the mouse is moved, the ball rolls along the reference surface generating varying sensing signals at internal contacts adjacent to the ball. Other pointing devices include the graphical tablet, stylus, light pen, joystick, puck, trackball, and more recently, the isometric post (e.g., erasure-head pointing device such as IBM's Trackpoint) and the touchpad, (e.g., Apple Computer's Trackpad). The isometric post resembles a pencil-head eraser and is situated among keys of a keyboard. The isometric post protrudes up above the surrounding keys and is operated by applying directional pressure with a single finger in contact with the post. The touchpad has a generally planar surface and employs field distortion sensing, a form of capacitance sensing technology. The planar surface includes a covered grid of electrical conductors defining an electrical field. When a user touches the surface, the user's fingertip distorts a localized area of the electrical field. The grid is regularly scanned to sense the strength of any distortion at an electrical conductor. The row and column conductors exhibiting distortion indicate the user's finger location. Thus, finger motion, like mouse motion, can be tracked.

With the number of people using computers and the amount of time spent operating a computer increasing, ergonomic considerations for reducing operator fatigue and discomfort are increasingly important. With regard to pointing devices, easy, intuitive operation is desired. A shortcoming of the mouse for example, is the need to repeatedly move one's hand from the keyboard over to a separate mouse device. Improper body position and inconvenient spacing between the keyboard and the mouse can cause fatigue. This invention addresses the ergonomic and ease-of-use concerns associated with pointing devices, and particularly such concerns associated with notebook computer pointing devices.

SUMMARY OF THE INVENTION

According to the invention, a pointing device includes ergonomic buttons which wrap around the device's cursor control mechanism. According to one aspect of the invention, a button extends along at least two sides of the cursor control mechanism. A benefit of the wrap-around button is that a user can more easily find the button by touch. In particular, elongated areas and a corner-defining junction are easy to recognize by touch.

According to another aspect of the invention, a pair of wrap-around buttons are included which generally enclose the cursor control mechanism. In one embodiment a touchpad defines the cursor control mechanism, while a first wrap-around button is C-shaped and a second button is backward-C-shaped. A user can simply move off the touchpad to an adjacent button. A rail surrounds the cursor control mechanism between the buttons and the mechanism to define a border between the cursor control mechanism and the buttons. The rail also serves to block a user from accidentally pushing a button when working the cursor control mechanism.

According to another aspect of the invention, in one embodiment the cursor control mechanism includes a post and a "wobble" plate, (e.g., instead of a touchpad). The post is formed by an erasure-head pointing device or another post-like device responsive to directional pressure. The post serves as a pivot point for the plate. The plate is mounted onto the post-like device. A user then adjusts the planar orientation of the plate to define a directional pressure. More specifically, the user applies pressure to a location on the plate which tilts or "wobbles" the plate about the post. Such tilt defines a pressure directionally applied to the post-like device. The post-like device responds causing a corresponding directional movement of the on-screen cursor. An advantage of the "wobble" plate over an erasure-head pointing device is that a user is able to apply multi-fingered leveraged guidance. The multi-finger control gives the user more precise control over the cursor movement than a conventional erasure-head pointing device.

According to another aspect of the invention, an erasure-head device defines a second cursor control mechanism in one embodiment of this invention. Both cursor control mechanisms are relative pointing devices that enable control of cursor motion relative to a current position. The erasure-head device offers convenient, effective coarse control of the cursor's movement, while the first cursor control mechanism, as described above, offers effective, convenient fine control of the cursor's movement. Of particular note is that the wrap-around buttons are active regardless of which of the two cursor control mechanisms currently are being manipulated.

Advantages of the invention include convenient, intuitive pointing devices with easy to locate buttons. These and other aspects and advantages of the invention will be better understood by reference to the following detailed description taken in conjunction with the accompanying drawings.

BRIEF DESCRIPTION OF THE DRAWINGS

FIG. 4 is an exploded view of a cursor control mechanism for the pointing device of FIG. 2 according to an embodiment of this invention;

FIG. 5 is a perspective view of the underside of a cover plate component of the cursor control mechanism of FIG. 4; and FIG. 6 is a planar view of a cover plate according to an alternative embodiment of this invention.

DESCRIPTION OF SPECIFIC EMBODIMENTS

Overview

Figure 1:
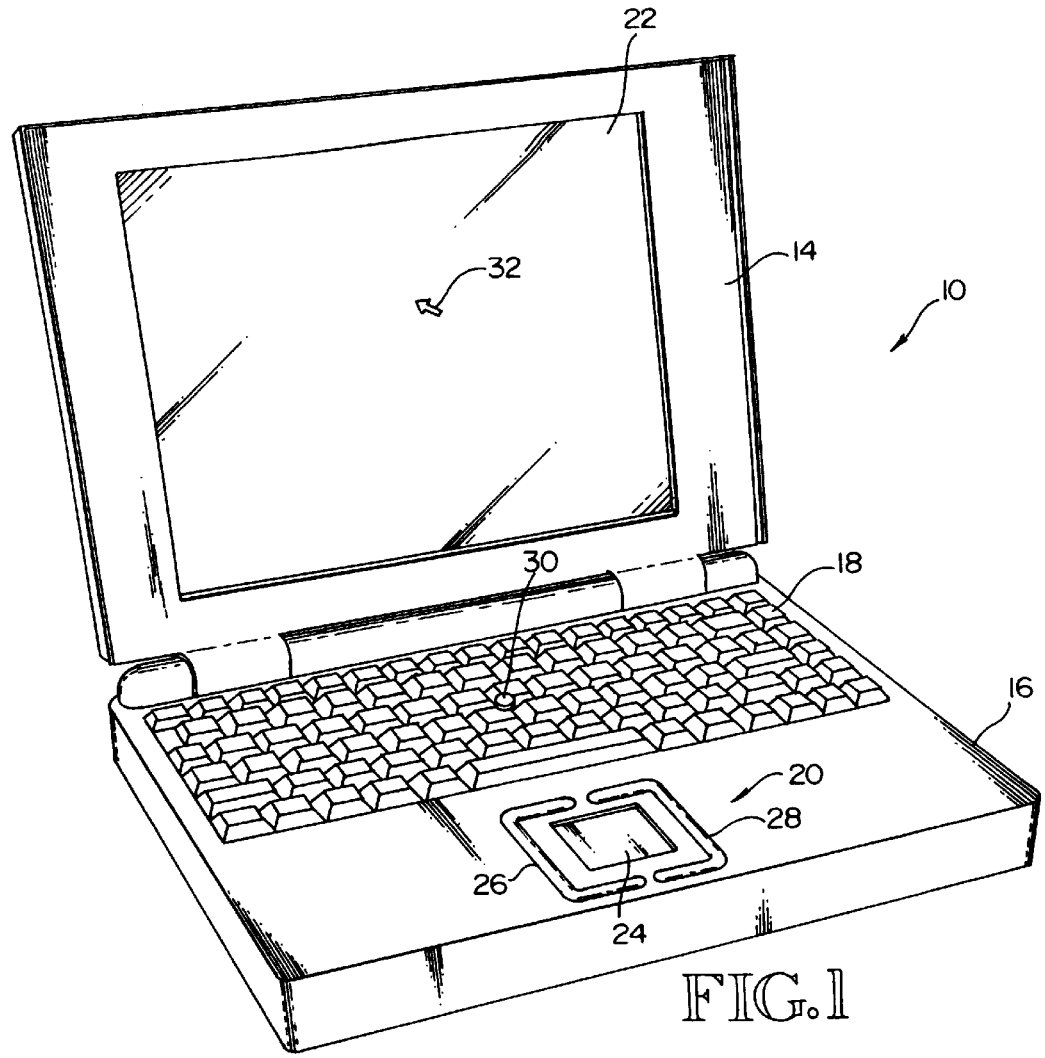
FIG. 1 is a perspective view of a notebook having a pointing device embodiment of this invention.

FIG. 1 shows a notebook computer 10 according to an embodiment of this invention. The computer 10 includes a display screen housing 14 hinged to a keyboard housing 16. A main processor board (not shown) receives inputs from a keyboard 18, and a pointing device 20. The processor board generates outputs to a display screen 22. Other components such as a hard disk drive, floppy disk drive, CD-ROM drive, are included in various embodiments and electrically coupled to the processor board. In addition one or more PC cards embodying a modem or other peripheral device conforming to the Personal Computer Memory Card International Association standards are included in some embodiments.

The pointing device 20 includes a first cursor control mechanism 24 and a pair of buttons 26, 28. In some embodiments, the pointing device 20 also includes a second cursor control mechanism 30. The function of a cursor control mechanism 24, 30 is to define the movement of an on-screen cursor 32. Such function is especially desirable for operating computers having a graphical user interface. A user manipulates the cursor control mechanism 24, 30 to control the cursor 32 motion. For example, a joystick or trackball is manipulated by the user. For a mouse the mouse is moved by the user relative to a reference surface. For an erasure-head device a user applies pressure to the "eraserhead" post. For a touchpad a user moves a finger across the pad. For each exemplary mechanism, the user defines cursor movement commands by some motion or manipulation. The tracking device of this invention is integral to the computer keyboard housing 16 and thus is not embodied by the conventional mouse which is grasped and moved relative to a reference surface.

Wrap-Around Buttons

Figure 2:
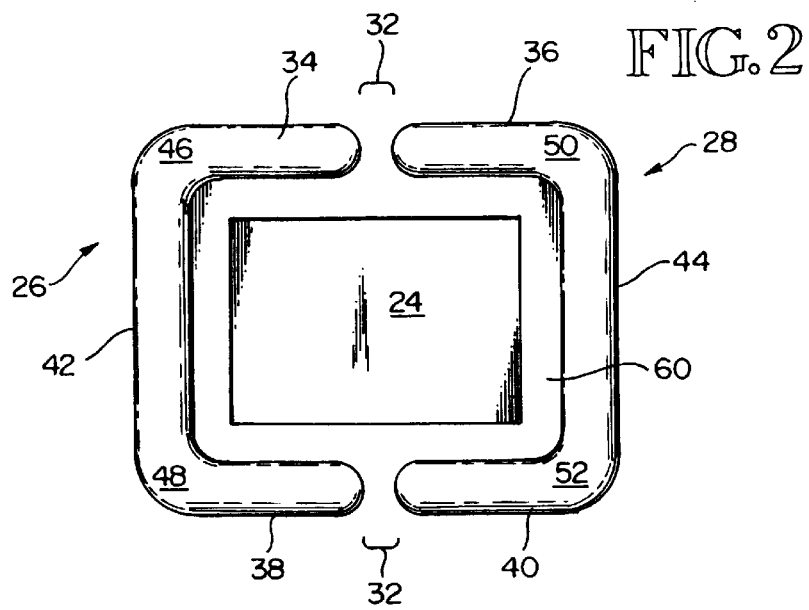
FIG. 2 is a planar view of a pointing device according to an embodiment of this invention.
Figure 3:
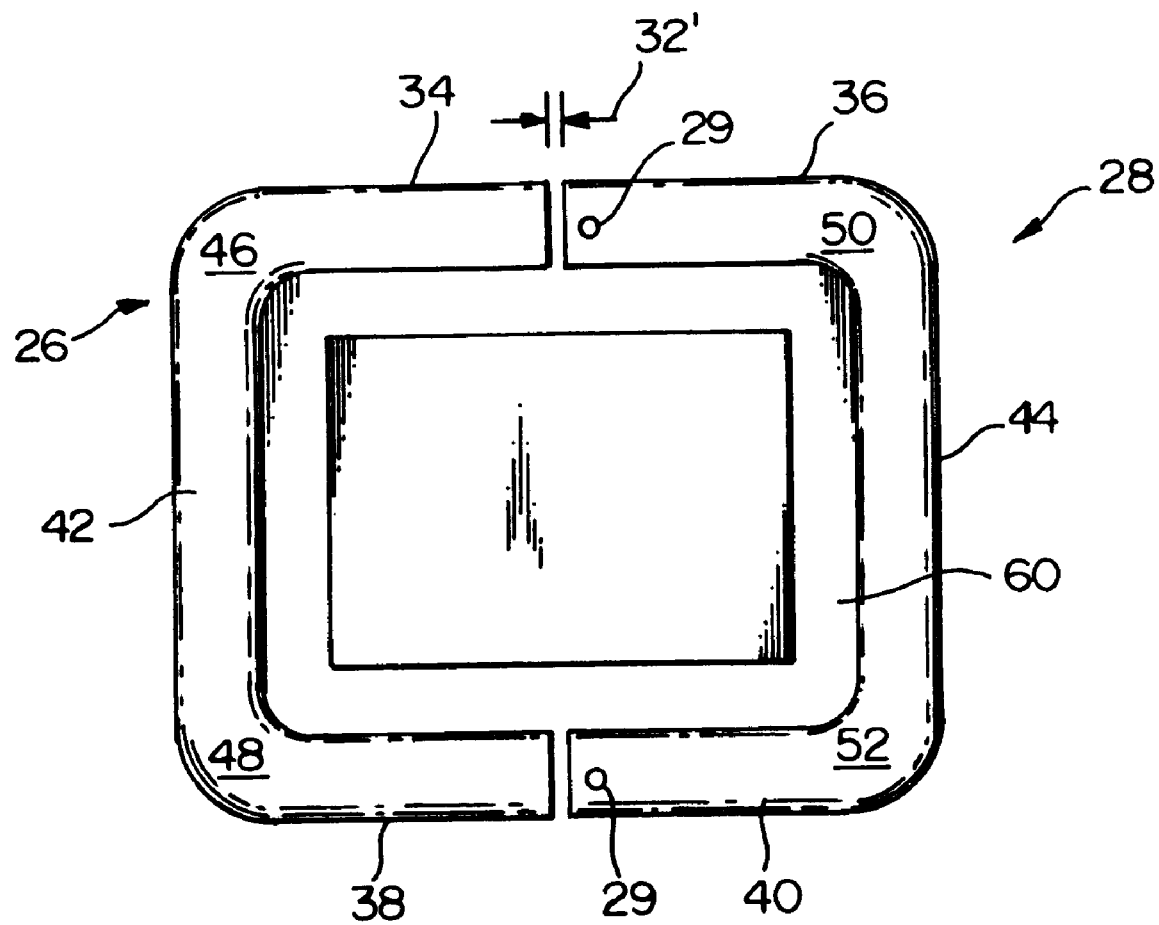
FIG. 3 is a planar view of a pointing device according to another embodiment of this invention.

Referring to FIGS. 1–3, the pointing device 20 includes a pair of wrap-around buttons 26, 28. Each button is for being pressed or "clicked" by an operator to initiate a prescribed or programmed function. Such functions include "pressing" on-screen buttons, choosing among a range of menu items, selecting objects, cells or groups of words in a document and dragging selected objects, cells, or groups. The specific function varies according to convention. In some embodiments one or more of the buttons 26, 28 is programmable by an operator enabling the operator to define a pointing command or other function to be performed.

As shown in FIG. 2, one button 26 is C-shaped, while the other button 28 is backward-C-shaped. The two buttons 26, 28 concentrically surround the first cursor control mechanism 24 over a substantial periphery of the mechanism 24. One button 26 includes an upper arm 34, a lower arm 38 and a connecting arm 42. The other button 28 also includes an upper arm 36, a lower arm 40 and a connecting arm 44. Spacing 32 between adjacent arms of respective buttons 26, 28 in one embodiment is sufficient for an operator's finger to discern the spacing 32 by touch. Such spacing 32 is less than a finger spacing in some embodiments and more than a finger spacing in other embodiments. The spacing is either the same or different between upper arms 34, 36 as between lower arms 38, 40. In an alternate embodiment, the spacing 32' is minimal with the buttons 26, 28 positioned edge to edge enabling an operator to depress both buttons with a single finger, (See FIG. 3). As a result, a "third" button function is defined as the concurrent pressing of both buttons 26, 28. To enable an operator to distinguish the two edge to edge buttons by touch, one button includes an elevated ridge or nodule 29 or varies in surface texture.

In the FIG. 2 embodiment, the cursor control mechanism 24 is rectangular so as to define four sides. Each button 26, 28 wraps around three sides of the first cursor control mechanism 24. Preferably, each button wraps around at least two sides of the first cursor control mechanism 24. Button 26, for example, includes an upper arm 34 extending along an upper side of the mechanism 24 and another arm 42 extending along lateral side of the mechanism 24. The two arms extend from a common junction 46 which defines a corner at an inner edge, (i.e., edge closest to mechanism 24). Thus, the two arms protrude from a common junction 46 to define an angle greater than 0 degrees and less than 180 degrees. Preferably the defined angle is approximately 90 degrees. Button 26 also includes a lower arm 38 extending along a lower side of the mechanism 24. The lower arm 38 and connecting arm 42 also extend from a common junction 48 which defines another corner at an inner edge. Button 28 similarly has arms extending along upper, lateral and bottom sides of the mechanism 24 which define common junctions 50, 52. Although the arms 34–44 of the two buttons 26, 28 are shown having generally uniform width, the widths and shapes of each arm may vary. For example, the junction regions 46–52 are of exaggerated size in some alternate embodiments. Also, in some embodiments outer edges of the buttons define a smoother curve than the square-C shape shown in FIG. 2. For example, a square C-shape occurs along an inner edge, while a rounder C-shape occurs along an outer edge to define larger button surfaces. In addition, the corners defined by the junction inner edges can vary between inward corners sharp to the touch and inward corners that are smoother conforming more closely the curve of an operator's finger. In the embodiment illustrated four chamfered corners are defined each exhibiting an angle greater than 0 degrees and less than 180 degrees—preferably approximately 90 degrees.

Note that for the FIG. 2 embodiment the cursor control mechanism 24 is rectangular and readily defines sides to be wrapped. An elliptically-shaped mechanism 24 also defines sides. For a generally round mechanism 24 the sides are less easily distinguished. For such an embodiment, the sides that are to be wrapped around are defined by a border 60 surrounding the mechanism 24 and/or inner edges of the buttons 26, 28.

First Cursor Control Mechanism

The first cursor control mechanism 24 is integral to the computer 10 and, although manipulable, remains stationary relative to the keyboard housing. In one embodiment the mechanism 24 is a touchpad across which an operator moves their finger to direct cursor movement. The border 60 surrounding the touchpad is elevated relative to the sensitized touchpad surface. Thus, when an operator moves a finger across the surface, the rail serves as a block to prevent the operator from inadvertently moving the finger onto a button and pressing the button. In some embodiments software for the touchpad determines when an operator's finger is at the edge of the sensitized touchpad surface adjacent to the border 60. Upon such detection, the software continues directing cursor motion in a direction defined by where the operator's finger occurs along the border. Specifically the finger location defines a directional vector for the cursor motion.

Previously, manufacturers have made buttons adjacent to the touchpad hard to press to avoid inadvertent pressing. A softer click is easier for the operator. By using an elevated border surrounding the touchpad, an operator detects the touchpad edge by touch and can develop touch recognition to stop from inadvertently pressing the adjacent button 26, 28. Thus, the buttons implemented are able to have a "softer" click. The surrounding border 60 need not be of exaggerated height, simply enough for a finger to readily discern a change in elevation, and thus, an edge of the touchpad.

The buttons 26, 28 are of the same elevation, a lesser elevation or a higher elevation as the border 60. Preferably, there is a gap between the buttons and the border 60 and/or a change in elevation. The gap or elevation change serves to allow fingertip recognition of the button location. Higher elevation is preferable to lower elevation for more readily identifying the button by touch. The extension of a given button around multiple sides of the mechanism 24 is particularly advantageous for allowing an operator to recognize a button location by touch. In experimental use, it was discovered that operators trained themselves to move to a corner region to sense a button 26, 28 by touch. The corner corresponds to an inner edge of a button 26, 28 adjacent to the border 60. Thus, embodiments making the corner easily recognizable are preferred. The corner shape, curve and texture aid the operator in identifying a button and in repeatedly seeking out a known place to push the button 26, 28.

In some embodiments a button 26/28 enables a lateral travel path while depressed. An operator pushes the button down, then slides the button to a locked position. While in the locked position, the operator's fingers are free to move along the sensitized touchpad surface. Thus, the button maintains a finger-free pressed position while the operator moves the cursor. Such capability is useful for implementing a drag and drop function. Once the function is complete, the operator slides the button out of the locked position and releases the button to a relaxed, unpressed position.

FIG. 4 shows an embodiment of a first cursor control 24' mechanism according to another aspect of this invention. The mechanism 24' is formed by an isometric post device 70, such as an erasure-head device, and a cover plate 72. The post device 70 is mounted to the keyboard housing 16 and is surrounded by the wraparound buttons 26, 28, (see FIGS. 1–3). The device 70 includes a post 74 and a base 76 to which the post 74 is mounted. In one embodiment the post 74 is formed by a resilient rubber material conventionally used as the eraser-head portion of a trackpoint-like device. In an alternative embodiment, the post 74 instead is made of a plastic or other material. The cover plate 72 includes an upper surface 82 (see FIG. 4) and a lower or under surface 84 (see FIG. 5). The upper surface is smooth and generally planar. In the embodiment shown the upper surface gently curves from a top elevation at the center of the plate toward a lower elevation at the peripheral edges of the plate. The gradually sloping elevation starting from the center serves as a fingertip aid for indicating by touch the general location of one's fingers on the plate. In one embodiment the upper surface 82 includes recesses or protrusions 78 for assisting the operator in controlling the mechanism 24' by touch. For example, arrowheads recognizable to the touch are shown in the FIG. 4 embodiment. Other direction indicating shapes also are used in alternative embodiments. In other embodiments the shapes are the same for each direction. Even though the same shape, the recesses or protrusions are felt by the touch and aid the operator in finding a comfortable repeatable home position to rest their fingertips when manipulating the mechanism 24'.

The under surface 84 defines a channel 86 for receiving the post 74. In various embodiments the cover plate 72 is either permanently or removably held to the post 74. A permanent method of attaching the cover plate 72 is to use an adhesive material to secure the plate and post together. A removable method of attaching the plate is to machine a tight tolerance of the channel 86 dimensions and the post 74 peripheral dimensions. Also, although the post 74 and channel 86 are shown as being circular, the peripheral shape may vary to increase the surface areas in contact or to provide a non-rotatable connection between plate 72 and post 74. In one embodiment the cover plate 74 defines a hollow cylindrical protrusion 88. The channel 86 is defined within the hollow of the protrusion 88. In another embodiment the channel 86 is defined onto a generally flat or arced under surface 84.

An operator uses the mechanism 24' to control cursor 32 movement by placing multiple fingers on the cover plate and applying fingertip leverage to manipulate the plate from a given rest orientation to an alternative orientation. For example, the cover plate 72 defines a vector 79 normal to the plate upper surface 82 taken from the center of plate 72. The position of this vector 79 when the mechanism 24' is undisturbed and at rest defines the rest orientation of plate 72. The operator changes the direction of such vector 79 by applying one or more forces at positions on the plate 72. Using multi-fingertip control the operator finely controls the orientation of the plate 72 to vary the orientation from the rest orientation. The leveraged force applied by one's fingertips acts upon the post 74 through the plate 72. In effect, the post 74 serves as a pivot point for the plate 72. The plate 72 in effect defines a torque arm for acting upon the post 74. The post 74 like the erasure-head device responds to the directional force. Specifically, a sensor responsive to directional force detects the direction of force and moves the on-screen cursor 32 in a corresponding direction. Although an erasure-head device is described as embodying the post 74 and base 76, other post-like devices responsive to a directional force are used in alternative embodiments.

FIG. 6 shows an alternative embodiment for the cover plate 72. Specifically, FIG. 6 shows a round cover plate 72'. Note that for a round cover plate 74', the sides of the mechanism 24' still are wrapped-around by the buttons 26, 28. Such sides, as used herein, are defined by the button 26, 28 shapes (e.g., general appearance; inner edges; or outer edges) or by the border 60 shape, (see FIGS. 1–3).

Second Cursor Control Mechanism

Referring again to FIG. 1, according to another aspect of the invention the pointing device 20 also includes a second cursor control mechanism 30. In a preferred embodiment the second cursor control mechanism 30 is an erasure-head or other isometric post device positioned among the keys of a keyboard 18. The erasure-head embodiment includes an eraser-head tip protruding to an elevation above the adjacent keys. The eraser-head provides a pliable texture with sufficient friction to enable an operator to retain a finger on the head while applying a force. Other textures are used in alternative embodiments. Preferably, however, the post texture is different from that of the adjacent keys. The distinction makes the device recognizable by touch and easy to use.

To control a cursor 32 position, an operator applies a single finger to the eraser-head of device 30 and exerts a force in a desired direction. The on-screen cursor 32 then moves in the direction corresponding to the desired direction. The isometric post device 30 includes a sensor responsive to pressure applied by an operator. A controller chip receives the pressure signals and generates cursor control signals. In one embodiment the controller chip available from IBM of Armonk, N.Y. as part no. 59G3315.

One difficulty of conventional pointing devices limited to an erasure-head device as their cursor control mechanism is that fine, precise cursor movements are difficult to control. The erasure-head device only has a small area to be touched. Comfortably, the operator can only apply one finger to its post. Further, the erasure-head device does not move substantially. The erasure-head resists movement, while generating electrical signals responsive to directional pressure. In use it is difficult for an operator to finely control the applied pressure. The advantage of the erasure-head device is its convenient location integral to the computer and its proximity to one's typing fingers. These advantages make the erasure-head device convenient and easy to use. By including two cursor control mechanisms 24, 30, the isometric post device 30 can be used by an operator for coarse control of the cursor position, while another mechanism 24 can be used for fine control of cursor position. More significantly devices of different sensitivities are implemented as cursor control mechanisms 24, 30 based upon differing physical construction and/or software sensitivity settings.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A pointing device for a computer, comprising:
a first cursor control mechanism for use by an operator to define movement of a cursor on a display screen of the computer, the first cursor control mechanism residing in a housing which remains stationary during operation of the first cursor control mechanism, the first cursor control mechanism having a plurality of sides;
one or more buttons which together wrap around all sides of the first cursor control mechanism that are within the plane of the housing;
in which said one or more buttons comprises a first button which has a first edge toward the first cursor control mechanism and a second edge away from the first cursor control mechanism, the first button comprising a first portion and a second portion extending from a common junction, the first portion and second portion relatively oriented to define a first angle which is less than 180 degrees, wherein the first control mechanism is positioned within an area defined by said first angle, and wherein the first portion, second portion and common junction are distinguishable along both the first edge and the second edge of the first button;
in which said one or more buttons further comprises a second button having a first edge toward the first cursor control mechanism and a second edge away from the first cursor control mechanism, the second button comprising a first portion and a second portion extending from a common junction, the first portion and second portion relatively oriented to define a second angle which is less than 180 degrees, wherein the first control mechanism is positioned within an area defined by said second angle, and wherein the first portion, second portion and common junction of the second button are distinguishable along both the first edge and the second edge of the second button; and
further comprising a border accessible to a user's touch during operation of the first cursor control mechanism, wherein the border is distinct from the first button and the second button and is adjacent to the first cursor control mechanism, wherein the border is elevated relative to the first cursor control mechanism and distinguishable from the first cursor control mechanism by touch, and in which the first and second buttons together wrap around the first cursor control mechanism, and in which the border is positioned intermediately between the first cursor control mechanism and the surrounding first button and second button along an entire periphery of the first cursor control mechanism.

2. A pointing device for a computer, comprising:
a first cursor control mechanism for use by an operator to define movement of a cursor on a display screen of the computer, the first cursor control mechanism residing in a housing which remains stationary during operation of the first cursor control mechanism; and
a first button which wraps around multiple sides of the first cursor control mechanism;
wherein the pointing device is housed in a common body with the computer and a computer keyboard, the pointing device further comprising a second cursor control mechanism distinct from keys of the keyboard and positioned among the keys of the keyboard, the second cursor control mechanism operable for coarse control of cursor position, the first cursor control mechanism enabling fine control of cursor position.

3. A pointing device for a computer, comprising:
a first cursor control mechanism for use by an operator to define movement of a cursor on a display screen of the computer, the first cursor control mechanism residing in a housing which remains stationary during operation of the first cursor control mechanism;
a first button;
a second button; and
a border separating the first cursor control mechanism from the first button along one portion of the border and separating the first cursor control mechanism from the second button along another portion of the border, and wherein the border is elevated relative to the first cursor control mechanism and distinguishable from the first cursor control mechanism by touch; and
wherein the first button and second button together wrap around the first cursor control mechanism.

4. A pointing device for a computer housed in a common body with a computer processor and a computer keyboard, comprising:
a first cursor control mechanism for use by an operator to define movement of a cursor on a display screen of the computer, the first cursor control mechanism residing in a housing, the housing remaining stationary during operation of the first cursor control mechanism;
a second cursor control mechanism distinct from keys of the keyboard and positioned among the keys of the keyboard for use by an operator to define movement of the cursor on the display screen of the computer; and
a first button active during use of any of the first cursor control mechanism and second cursor control mechanism.

5. The pointing device of claim 4, in which the first cursor control mechanism comprises a touchpad surface which enables more precise control of cursor movement than the second cursor control mechanism.

6. The pointing device of claim 4, in which the first button comprises a first portion and a second portion extending from a common junction, the first portion and second portion relatively oriented to define a first angle which is less than 180 degrees, and wherein the first cursor control mechanism is positioned within an area defined by said first angle.

7. The pointing device of claim 4, further comprising a second button and in which the first button and second button which together wrap around the first cursor control mechanism.

8. The pointing device of claim 4, in which the first cursor control mechanism comprises:

a post responsive to directional pressure, the direction of pressure applied determining direction of motion of an on-screen cursor;

a covering mounted to the post, the post serving as a pivot point for the covering, the covering defining an area larger than a keyboard key and being of sufficient area to receive contact from multiple fingers of an operator, the operator controlling orientation of the covering to apply directional pressure to the post.

9. A pointing device for a computer, comprising:

a first cursor control mechanism for use by an operator to define movement of a cursor on a display screen of the computer, the first cursor control mechanism residing in a housing which remains stationary during operation of the first cursor control mechanism, the first cursor control mechanism comprising:

a post responsive to directional pressure, the direction of pressure applied determining direction of motion of an on-screen cursor; and a covering mounted to the post, the post serving as a pivot point for the covering, the covering defining an area larger than a keyboard key and being of sufficient area to receive contact from multiple finders of an operator, the operator controlling orientation of the covering to apply directional pressure to the post;

wherein the pointing device is housed in a common body with the computer and a computer keyboard, the pointing device further comprising a second cursor control mechanism distinct from keys of the keyboard and positioned among the keys of the keyboard, the second cursor control mechanism operable for coarse control of cursor position, the first cursor control mechanism enabling fine control of cursor position.

10. A pointing device for a computer, comprising:

a first cursor control mechanism for use by an operator to define movement of a cursor on a display screen of the computer, the first cursor control mechanism residing in a housing which remains stationary during operation of the first cursor control mechanism;

a first button which wraps around multiple sides of the first cursor control mechanism, the first button having an elongated upper arm extending in a first direction, an elongated lower arm extending in the first direction, and an elongated connecting arm extending between the upper arm and lower arm, wherein a first junction between the upper arm and connecting arm defines a first angle which is less than 180 degrees, and wherein a second junction between the connecting arm and the lower arm defines a second angle which is less than 180 degrees, and wherein the upper arm extends adjacent to a first side of the first cursor control mechanism, the lower arm extends adjacent to a second side of the first cursor control mechanism opposite the first side, and the connecting arm extends adjacent to a third side of the first cursor control mechanism;

a second button, the second button having an elongated upper arm extending in a first direction, an elongated lower arm extending in the first direction, an elongated connecting arm extending between the upper arm and lower arm, wherein a first junction between the second button upper arm and second button connecting arm defines a first angle which is less than 180 degrees, and wherein a second junction between the second button connecting arm and the second button lower arm defines a second angle which is less than 180 degrees, and wherein the second button upper arm extends adjacent to a first side of the first cursor control mechanism, the second button lower arm extends adjacent to a second side of the first cursor control mechanism opposite the first side, and the second button connecting arm extends adjacent to a fourth side of the first cursor control mechanism; and a border distinct from the first button and the second button and adjacent to the first cursor control mechanism, wherein the border is elevated relative to the first cursor control mechanism and distinguishable from the first cursor control mechanism by touch, and in which the first and second buttons together wrap around the first cursor control mechanism, and in which the border is positioned intermediately between the first cursor control mechanism and the surrounding first button and second button along an entire periphery of the first cursor control mechanism.

* * * * *